United States Patent

[11] 3,609,718

[72] Inventor Hubert G. De Vries
Littleton, Colo.
[21] Appl. No. 827,709
[22] Filed May 26, 1969
[45] Patented Sept. 28, 1971
[73] Assignee Ferroxcube Corporation
Saugerties, N.Y.

[54] MAGNETIC ARRAY ORGANIZATION
8 Claims, 3 Drawing Figs.

[52] U.S. Cl. .......... 340/174 DC, 340/174 M, 340/174 AC, 340/174 AD, 340/174 RC
[51] Int. Cl. .......... G11c 5/02, G11c 11/06
[50] Field of Search .......... 340/174 M

[56] References Cited
UNITED STATES PATENTS

| | | | |
|---|---|---|---|
| 3,421,155 | 1/1969 | Glock | 340/174 |
| 3,155,942 | 11/1964 | Hoover | 340/174 |
| 3,308,448 | 3/1967 | Shahbender | 340/174 |

*Primary Examiner*—James W. Moffitt
*Attorney*—Frank R. Trifari

ABSTRACT: A magnetic memory matrix having a three-wire configuration including a sense winding wound through the array in a manner wherein the winding enters adjacent cores in the array and is wound in parallel with column drive lines. The sense line reenters the array in alternate columns, thereby maintaining small external array loops. A current driver coupled to an additional core line provides Delta noise cancellation.

Figure 1:
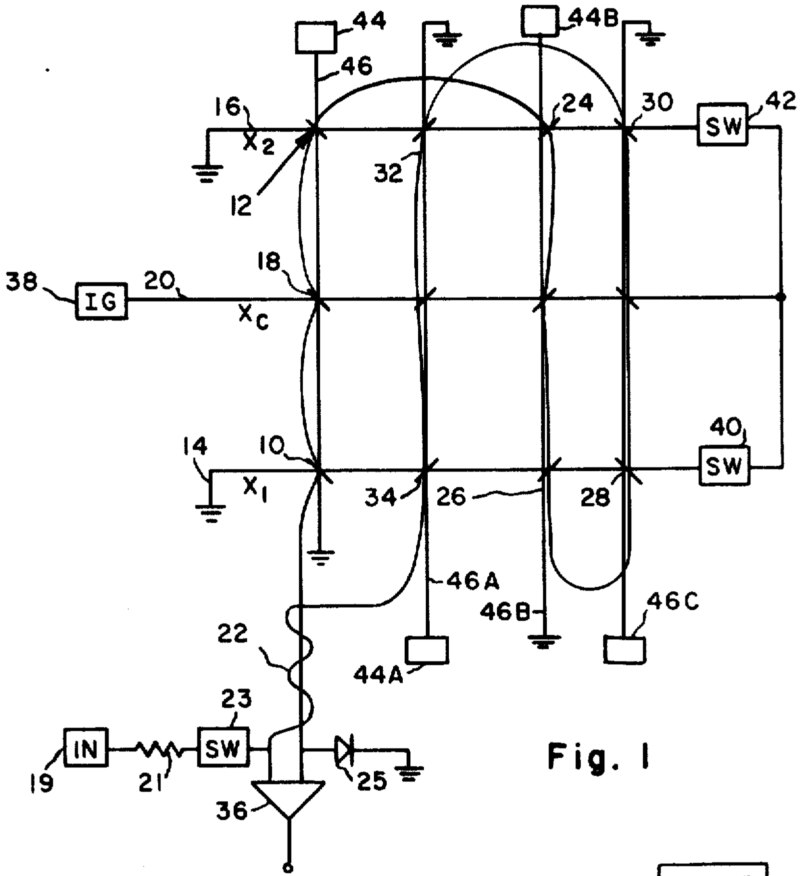

INVENTOR.
HUBERT G. DeVRIES

BY [signature]
AGENT

INVENTOR.
HUBERT G. DeVRIES
BY
[signature]
AGENT

MAGNETIC ARRAY ORGANIZATION

This invention relates generally to information storage systems and more particularly to such systems employing bistable magnetic storage devices.

Conventional memory systems, employing elements of bistable square loop magnetic materials, utilize coincident current storage. Information stored in the element is determined by applying a magnetic field in a given direction and observing the EMF induced in a wire in linking the element. In a conventional coincident drive system, the elements, which are conventionally toroidal and termed cores, are arranged in the form of the matrix. The usual method of wiring the matrix is to employ four single turn windings for each core. These windings include two drive windings, a sense winding, and an inhibit winding. The drive winding pairs are referred to as the X and Y drive lines. The X and Y lines are address lines and operate to provide means for obtaining access to a single selected core within the array of cores for the purpose of inserting or removing data. The inhibit wire is used to prevent the storage of information in the selected core under certain conditions. The sensing or output wire provides an indication of the core content or state during readout. Since the sense wire is operative only during the read cycle, and the inhibit wire only during the write cycle, the inhibit and sense wires can be combined into a single line. Such systems are known as three wire systems. Three wire systems are inherently simpler than four wire systems in construction due to the lesser amount of wires necessary for threading the cores. The three wire system is preferable to the four wire system since it is possible to exhibit a better signal noise ratio, a higher Delta noise cancellation factor, reduced core requirements, and less components. In employing three wire systems, however, it is important to maintain optimum signal noise ratios and good common mode rejection. As the size of the memory plane or mat increases, the number of commonly wired cores similarly increases, and noise problems become greater.

To achieve noise cancellation in conventional three or four wire systems, data selection or drive lines are coupled to a current driver for providing selection current along a pair of lines wound so as to provide opposing disturb noise levels in selected lines. This arrangement produces bipolar output signals, and requires a sense amplifier which can accommodate bipolar inputs. Because the line pairs have a common origin, and each line requires a one-half inhibit current, the current driver must provide a full inhibit current level to each line pair. Utilization of a full select current driver therefore necessitates a high power driver, and power source, along with attendant problems such as heat and power source requirements.

The winding arrays for conventional matrices employ various combinations of sense or output line windings designed so as to eliminate Delta noise and provide good common mode. The most conventional wiring arrangement is one that insures that currents in adjacent sense wires reach the sense amplifier at the same time, with the same phase and magnitude. The sense winding should be wound so as to couple half the disturb cores in one sense and half in the other in order to provide Delta noise cancellation. Systems currently in use employ wiring patterns which require the sense winding to be threaded through different rows or columns through the matrix in a sense which is diagonal to the row and column lines. Although this arrangement provides adequate Delta noise cancellation, it is difficult to achieve a satisfactory common mode rejection characteristic because the sense line characteristic will present varying phase and magnitudes of nonselect noise to the sense amplifier. Also, a sense amplifier which accommodates bipolar inputs is large, complex, has high power requirements and is expensive. The diagonal winding arrangement is expensive, inconvenient and difficult to set out in practice.

It is, therefore, the primary object of this invention to provide a memory system, employing square loop bistable magnetic memory elements, and having characteristics superior to characteristics heretofore attainable with such systems.

It is a further object of this invention to provide a memory array having improved common mode rejection and improved Delta noise cancellation.

It is a still further object of this invention to provide a memory array utilizing a current driver which need only supply a one-half select current magnitude, thereby reducing overall power requirement.

It is another object to provide a winding pattern for a three wire memory array which is less expensive, less inconvenient and less difficult to construct.

It is a still further object to provide a wiring array for a memory system which provide a unipolar output, thereby requiring a sense amplifier which need only require accommodation of unipolar pulses, and therefore be smaller, less expensive, require simple power requirements than a corresponding amplifier for bipolar pulses.

The forgoing objects are attained and the problems of unwanted noise generation in the sense windings overcome by providing a novel winding pattern and energizing means for permitting controlled noise cancellation. Thus, in a three wire system the invention provides a core field having a data wire which is combined sense and inhibit wire which is bifilar in nature. The bifilar winding possesses a low induction and thereby reduces inhibit current rise time. Because of the bifilar wound nature of the lines, the same physical location provides each line with substantially the same impedance characteristics at adjacent points. A noise or stimulus at any point along the line produces substantially the same noise level at adjacent points along the lines. Thus, the data wire has good common mode characteristics and results therefore in improved signal to noise ratio. Delta noise cancellation is accomplished by utilizing staggered pulse drive and an additional drive wire and core line having real current flowing in sense opposite to the current flowing through the selection drive lines.

The bifilar winding array produces a unipolar output. The additional core line is a nondata line which is employed for generating an opposite polarity disturb for complementary matching of the noise produced in the selected core line. The resultant is an effective Delta noise cancellation. The winding pattern also utilizes a single turn or line through all cores, and thus permits use of a current generator of a one-half inhibit current level.

Figure 2:
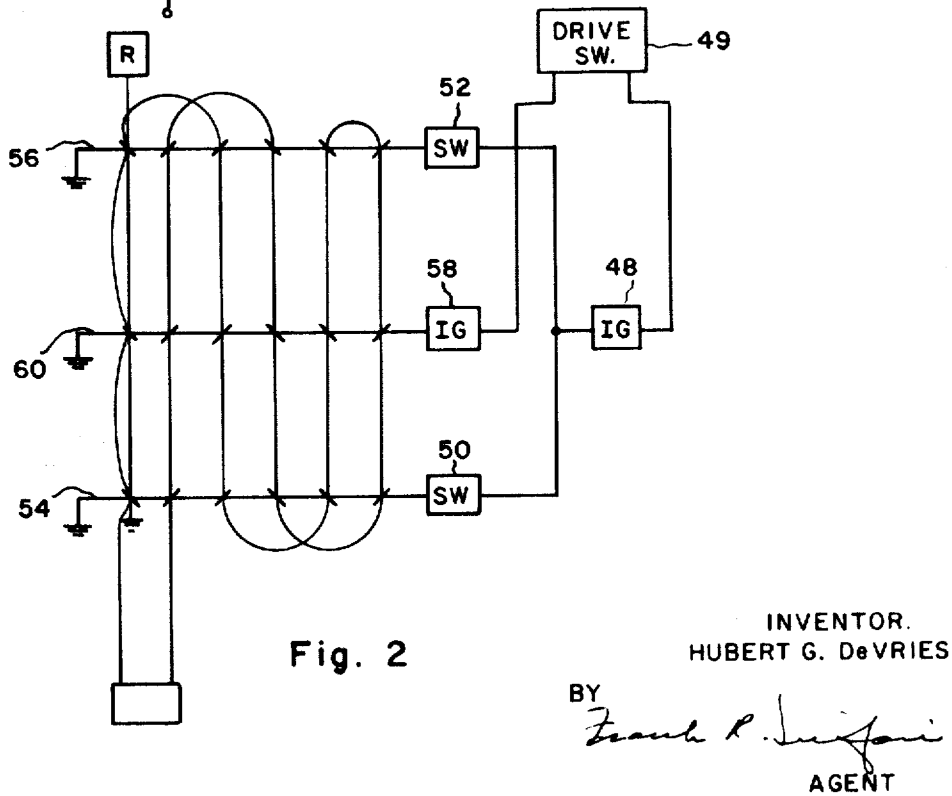
Figure 3:
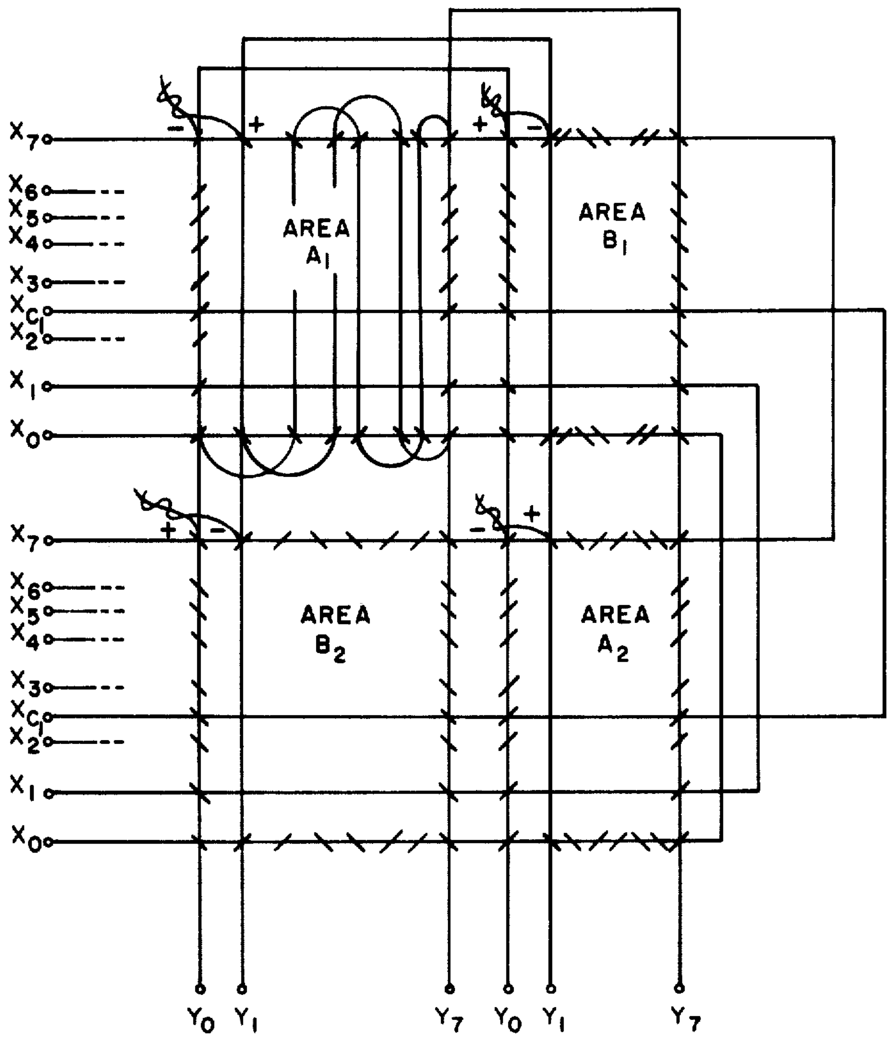

The forgoing brief description and objects as well as further objects, features, advantages of this invention will be apparent from the following more particular description of preferred embodiments in the invention as illustrated in the accompanying drawings within:

FIG. 1 a schematic illustration of the bifilar winding arrangement and additional Delta noise cancellation core line, FIG. 2 is an alternative embodiment of FIG. 1 and FIG. 3 shows the invention being utilized in a large scale core mat.

Referring to FIG. 1, a three wire system is illustrated although it is understood that a four wire system can also be employed. A first core line 10 and a second core line 12 is illustrated having a first drive line 14 and a second drive line 16. An additional line of cores 18 threaded by a line 20 forms an additional line of cores utilized for Delta noise cancellation. The data wire, a single wire performing either a sense or inhibit functions, is a bifilar wound wire 22 which enters the core mat through adjacent cores as illustrated in core line 10 of FIG. 1. The data line enters through the first core in each column, passing through the core mat along the column parallel to the column drive line, and returns again to the third core 24, passing through the core 26 in the core line 10 and in again through core 28 of the core line 10. The wire emerges from core 30 in the core line 12 and reenters the core line 12 through the core 32 emerging again at the core 34 in the core line 10 and then bifilarly wound through the line 22 to a suitable output such as an amplifier 36. The cores are arranged along the columns of FIG. 1 in what can be termed an alternating herringbone pair with a column orientation. That is, the first two columns beginning at cores 10 and 34 herringbone in one direction while the next two columns beginning at cores 26 and 28 herringbone in the opposite direction. In a read operation, a line drive generator 38 provides current of a half select magnitude down the line 20 through the additional core line 18, and out through whichever one of the switches 42 or 40 has been selected by means of suitable and conventional logic. If, for example, switch 40 has been selected the current drive from the line drive generator 38 would pass through the switch 40 along the line 14 to a reference point or ground. A corresponding read drive coordinate source 44 would, at a somewhat staggered position (occurring at a time somewhat earlier than the initiation of the pulse originating in drive line 20) pass a coordinate half select current through the row drive line 46 to ground. Corresponding drive generators, 44A, 44B, 44C, alternate down the row lines. The purpose of staggering the pulses is to allow unwanted transients created by the leading edge of the drive pulse originating from source 38 to settle out. The arrangement shown in FIG. 1 is an abbreviated version only. The actual matrix array can comprise many cores running up into the thousands. In the arrangement shown in FIG. 1, the lines 14, 20 and 16 are respectively representative of the X lines, and are so designated as X1, XC and X2. The line 46, as and corresponding lines 46A, B, C, running through subsequent cores, represents the Y drive line, and is indicated with the term $Y_1$. The impedance characteristic or response of the data line to the drive current, due to the novel winding arrangement will be similar at the adjacent crossover points. Since bifilar windings are close together, response at each point is similar. Amplitude pulses are in phase at sense amplifier and thus cancel. If these were further apart, phase difference increases, allowing pulses to pass the sense amplifier. The novel wiring arrangement minimizes the phase difference by keeping points close together. Thus, referring to FIG. 1, response in the data wire due to the coupling coefficient between the data and drive wires, will respond to a drive pulse along line 14 with equal effect, due primarily to the position and orientation of the respective cores, thereby enhancing common mode rejection.

The data wire, as evident from the foregoing, will exhibit substantially the same impedance characteristic at any given point, as the drive line to which it is coupled at that given point in the array. Further, the data wire 22 is wound through the array such that the edge loops are kept as small as possible. By keeping the edge loops small, the data wire inductance is that much lower. The relationship $V=L\ di/dt$ indicates that with lower inductance, the same voltage will produce a more rapid rise time in leading edge current, and the converse, to maintain the same rise time, a lower voltage would be sufficient. In either event, by reducing the inductance an advantage is achieved. Referring again to FIG. 1 it may be noted that the select pulse passing through the additional core line 20 passes through the selected core line 14 or 16 in a direction opposite to that through the additional core line 20. Thus, a disturb condition created in the additional core line 20 will effectively cancel the corresponding condition in the selected core line. The disturb noise condition, Delta noise, is thereby considerably reduced. In a read operation, the arrangement of FIG. 1 operates to provide half select pulses along the line 20 to either line 14 or 16 and 46 to a desired core. Switching of the core will induce an output onto the line 22 for utilization to the amplifier 36. In a writing operation, half select pulses are again applied in the required direction along the line 20 to either selected line 14 or 16 and 46 to the desired core. If it is desired not to write in the core that has been selected by the coincidence selection of X and Y coordinates, an inhibit pulse, also of half select value, is applied along the line 22 and effectively blocks the selection of the particular core. Since the data line 22 is a single line in that it has no active current branch points, only a one-half current source need be used. Such an arrangement is particularly desirably when the array of FIG. 1, as utilized in practice in a much larger array, is in turn coupled by means of common X and Y drivers to other arrays, each array having a separate sense winding with means for inhibiting each of the sense windings in that particular plane where a selected core is not to be affected.

The data line can operate as a sense or inhibit line. If in sense, the output of the array is detected in the amplifier 36. In an inhibit mode, an inhibit generator 29 provides an inhibit current of a one-half select magnitude through a resistance 21 and an inhibit switch 23 to the data line 22 and out through diode 25. The inhibit source need have only a one-half magnitude since all the cores are coupled to the common line 22 without the need for current branch points.

Referring to FIG. 2 a corresponding arrangement is illustrated. The distinction of FIG. 2 over FIG. 1 is in the employment of a separate drive generator 48 for driving through the selected switches 50 or 52 of the desired core line, 54 or 56 respectively. An additional generator 58 is provided for driving the additional core line 60. In extremely long selection lines, a delay of propagation of a pulse down the length of the line due to such factors as stray capacitance on the line and capacitive or electrostatic intercoupling of the line, will cause mismatch in the desired correction characteristic of the additional core line. In other words, the compensating disturb characteristic generated in the line 60 may not be matched with the generated disturb characteristic in the selected line 54 or 56 during the same time period as the coincident application of line drive pulses. To compensate for this effect, the pulse generator 58 can be triggered simultaneously with the pulse generator 48 or at any specific desired interval by means of a common drive selection switch 49. Therefore, whereas the arrangement of FIG. 1 requires the disturbed pulse to propagate down through line 20 before it can then propagate up the line either 14 or 16, the arrangement of FIG. 2 although requiring extra components, insures against the mismatch of compensating disturbs due to delay. The generator 58 must generate an opposite polarity pulse $-Ig$ to compensate the $=Ig$ pulse produced by the generator 48.

Referring now to FIG. 3, the arrangement of a large scale core mat or core field utilizing the above discussed principles are illustrated. As illustrated in FIG. 3, four areas indicated as A1, A2, B1 and B2 are arranged with common X and Y drive lines. Each of the areas are arranged in opposite herringboned pairs of cores with respect to the Y coordinate. In each case, the illustration provides for eight Y column lines and eight X row lines. An additional X row line, $XC_1$ is illustrated and corresponds to the additional core line discussed above in connection with FIGS. 1 and 2. The additional line may be located at any row, but the middle is preferable. As shown in the drawing each of the areas A1, A2, B1 and B2 is provided with separate bifilar wound sense lines entering the core field associated therewith through pairs of adjacent cores. The use of the bifilar technique improves the common mode rejection characteristic of the sense line, provides unipolar output pulses, and allows the use of half select inhibit level pulses when writing information in any of the selected areas.

As shown in each of the FIGS. of this application, the sense winding is a bifilar type winding which enters into the matrix array through a pair of adjacent cores. The winding is designed to be parallel to or contiguous with the Y or column drive lines, although it could also be parallel to or contiguous with the X or row drive lines assuming that the row cores are rearranged so as to correspond to the manner in which the column cores are positioned in respect to one another.

While, in accordance with provisions of the statute, there has been illustrated and described the best form of the invention known, it will be apparent to those skilled in the art that changes may be made in the form of the apparatus disclosed without departing from the spirit of the invention, and that in some cases, certain features of the invention may be used to advantage without corresponding use of other features.

I claim:

1. In a magnetic storage array, the combination comprising a plurality of magnetic elements arranged in an array of rows and columns, first means magnetically coupled to each of said elements for providing a first drive pulse along a selected one of said columns, second means magnetically coupled to each of said elements for coupling a second drive pulse along a selected one of said rows, a first current source, a first switch coupling said current source to said second means for providing said second drive pulse, the coincidence of said first and second drive pulses selecting one of said elements, an additional row of magnetic elements, third means magnetically coupled to each element of said additional row of magnetic elements for coupling a third drive pulse along said additional row in coincidence with said first drive pulse, a second current source, a second switch coupling said second current source to said additional row for providing said third drive pulse, said first means coupling said selected element and one of the elements in said additional row, and fourth means responsive to the selection of said selected element for providing an output signal representative thereof, said fourth means exhibiting substantially the same impedance characteristic as said first means in response to said second drive pulse at any point common to said fourth and first means along their respective paths.

2. The combination of claim 1, wherein each of said first means includes a column driver, each of said drivers generating current drive pulses of opposite polarity in adjacent columns.

3. In a magnetic storage array, the combination comprising a plurality of magnetic elements arranged in an array of rows and columns, first means magnetically coupled to each of said elements for providing a first drive pulse along a selected one of said columns, second means magnetically coupled to each of said elements for coupling a second drive pulse along a selected one of said rows, a first current source, a first switch coupling said current source to said second means for providing said second drive pulse, the coincidence of said first and second drive pulses selecting one of said elements, an additional row of magnetic elements, third means magnetically coupled to each element of said additional row of magnetic elements for coupling a third drive pulse along said additional row in coincidence with said first drive pulse, a second current source, a second switch coupling said second current source to said additional row for providing said third drive pulse, said first means coupling said selected element and one of the elements in said additional row, and fourth means responsive to the selection of said selected element for providing an output signal representative thereof, said fourth means exhibiting substantially the same impedance characteristic as said first means in response to said second drive pulse at any point common to said fourth and first means along their respective paths, each adjacent element in a column arranged in pairs of alternating herringbones, said fourth means comprising a sense winding, said sense winding entering said array through a first element and passing down through a first column of elements, exiting from said array and reentering said array through a second column of elements, said second column being displaced from said first column by one column, said sense winding passing from column to column until the last column is reached, said sense winding exiting from said last column and reentering said array through a column adjacent to and previous from said last column, and continuing in alternating columns from column to column until said sense winding reemerges from said array through a column terminating in an element adjacent to the element through which said sense winding originally entered said array.

4. The combination of claim 3, wherein each of said first means includes a column driver, each of said drivers generating current drive pulses of opposite polarity in adjacent columns.

5. In a magnetic storage array, the combination comprising a plurality of magnetic elements arranged in an array of rows and columns, first means magnetically coupled to each of said elements for providing a first drive pulse along a selected one of said columns, second means magnetically coupled to each of said elements for coupling a second drive pulse along a selected one of said rows, a first current source, a first switch coupling said current source to said second means for providing said second drive pulse, the coincidence of said first and second drive pulses selecting one of said elements, an additional row of magnetic elements, third means magnetically coupled to each element of said additional row of magnetic elements for coupling a third drive pulse along said additional row in coincidence with said first drive pulse, a second current source, a second switch coupling said second current source to said additional row for providing said third drive pulse, said second switch further coupled to said first current source for simultaneously energizing said first and second current sources, said first means coupling said selected element and one of the elements in said additional row, and fourth means responsive to the selection of said selected element for providing an output signal representative thereof, said fourth means exhibiting substantially the same impedance characteristic as said first means in response to said second drive pulse at any point common to said fourth and first means along their respective paths.

6. The combination of claim 5, wherein each of said first means includes a column driver, each of said drivers generating current drive pulses of opposite polarity in adjacent columns.

7. In a magnetic storage array, the combination comprising a plurality of magnetic elements arranged in an array of rows and columns, first means magnetically coupled to each of said elements for providing a first drive pulse along a selected one of said columns, second means magnetically coupled to each of said elements for coupling a second drive pulse along a selected one of said rows, a first current source, a first switch coupling said current source to said second means for providing said second drive pulse, the coincidence of said first and second drive pulses selecting one of said elements, an additional row of magnetic elements, third means magnetically coupled to each element of said additional row of magnetic elements for coupling a third drive pulse along said additional row in coincidence with said first drive pulse, a second current source, a second switch coupling said second current source to said additional row for providing said third drive pulse, said second switch further coupled to said first current source for simultaneously energizing said first and second current sources, said first means coupling said selected element and one of the elements in said additional row, and fourth means responsive to the selection of said selected element for providing an output signal representative thereof, said fourth means exhibiting substantially the same impedance characteristic as said first means in response to said second drive pulse at any point common to said fourth and first means along their respective paths, each adjacent element in a column arranged in pairs of alternating herringbones, said fourth means comprising a sense winding, said sense winding entering said array through a first element and passing down through a first column of elements, exiting from said array and reentering said array through a second column of elements, said second column being displaced from said first column by one column, said sense winding passing from column to column until the last column is reached, said sense winding exiting from said last column and reentering said array through a column adjacent to and previous from said last column, and continuing in alternating columns from column to column until said sense winding reemerges from said array through a column terminating in an element adjacent to the element through which said sense winding originally entered said array.

8. The combination of claim 7, wherein each of said first means includes a column driver, each of said drivers generating current drive pulses of opposite polarity in adjacent columns.